(12) United States Patent
Miller et al.

(10) Patent No.: US 7,949,112 B2
(45) Date of Patent: May 24, 2011

(54) CALLER IDENTIFICATION BILLING

(75) Inventors: Sam Allen Miller, Plano, TX (US); Michelle M. Tompkins, Thompton, CO (US); Patricia K. Key, Huntsville, NC (US)

(73) Assignee: JDS Uniphase Corporation, Milpitas, CA (US)

( * ) Notice: Subject to any disclaimer, the term of this patent is extended or adjusted under 35 U.S.C. 154(b) by 1456 days.

(21) Appl. No.: 11/364,697

(22) Filed: Feb. 28, 2006

(65) Prior Publication Data
US 2007/0201648 A1  Aug. 30, 2007

(51) Int. Cl.
H04M 15/00 (2006.01)
H04M 1/56 (2006.01)
H04M 15/06 (2006.01)

(52) U.S. Cl. ............... 379/142.04; 379/126; 379/142.06; 379/114.28

(58) Field of Classification Search ............. 379/114.01, 379/114.03, 114.05, 114.28, 114.29, 121.01, 379/121.05, 126, 142.06, 245–246, 142.04
See application file for complete search history.

(56) References Cited

U.S. PATENT DOCUMENTS

| | | | | |
|---|---|---|---|---|
| 6,130,941 | A * | 10/2000 | Nimmagadda et al. | 379/230 |
| 6,298,123 | B1 * | 10/2001 | Nolting et al. | 379/111 |
| 6,694,001 | B1 | 2/2004 | Lampell et al. | |
| 6,748,069 | B1 * | 6/2004 | Nimmagadda et al. | 379/201.07 |
| 6,891,938 | B1 | 5/2005 | Scott et al. | |
| 2005/0044237 | A1 * | 2/2005 | Sitaraman et al. | 709/227 |
| 2008/0056477 | A1 * | 3/2008 | Fleischer et al. | 379/211.02 |
| 2008/0130861 | A1 * | 6/2008 | McLarty et al. | 379/211.02 |
| 2010/0296508 | A1 * | 11/2010 | Lewis | 370/352 |

* cited by examiner

Primary Examiner — Binh K Tieu
(74) Attorney, Agent, or Firm — Volentine & Whitt, PLLC

(57) ABSTRACT

A method for attributing costs for a telephone call in an SS7 network. Information associated with the telephone call is captured and retained when the telephone call is provided to a call recipient by a second carrier that is a UNE-P lessee of a first carrier. The captured information is stored when including a CNAM query. The CNAM query is associated with the second carrier and reflected in an updated record containing the total volume of CNAM queries handled by the first carrier for the second carrier.

19 Claims, 5 Drawing Sheets

US 7,949,112 B2

CALLER IDENTIFICATION BILLING

BACKGROUND OF INVENTION

The invention is directed to the communication field, particularly to the assembly of billing information associated with the provision of the identity of a telephone caller. One of the telephone services available is caller identification or caller ID whereby a recipient of a telephone call may learn the identity of the caller prior to taking the telephone call, thereby permitting the recipient having a telephone with a display to avoid conversations with unwanted callers.

The identity of the caller is associated with the telephone call during establishment of the connection between the caller and the call recipient. Currently, Signaling System #7, or SS7, is the control protocol used to coordinate the handling of a telephone call. Upon entry of the called number, an available trunk line between the calling and called telephone is reserved for the voice communications and a separate route between the calling and called telephones is established for the interchange of control information. Control information may include confirmation of receiver uptake and receiver hangup and direction for delivery of a calling ring or a busy signal. The control information passes between service switching points (SSPs) via one or more signal transfer points (STPs) in the form of packets. One SSP is connected to the calling telephone and the other SSP to the called or receiving telephone. Service control points (SCPs) connected to the STPs provide access to data bases that may include telephone numbers correlated with customer names.

Under the Telecommunications Act of 1996, providers of telecommunication services are divided into several groups. Local exchange carriers (LECs) are independent telephone service providers that offer local telephone service to telephone customers in a specific geographic area. A LEC is usually a local telephone company. Incumbent local exchange companies (ILECs) existed prior to the Act and had co-existed with LECs owned by the Regional Bell Operating Companies (RBOCs). Competitive Local Exchange Carriers (CLECs) entered local areas after the Act and compete with ILECs.

One purpose of the Act was expansion of the numbers of service providers available to telephone customers by encouragement of formation of additional CLECs. To this end, the Act requires ILECs to provide to CLECs at wholesale rates access to unbundled network element platforms (UNE-Ps), such as local loops, switch ports, and dedicated common transport facilities owned by the ILECs, thereby allowing ILEC telephone customers to switch or port their service to a CLEC.

Even though ported telephone customers receive service through a CLEC and are billed by the CLEC, the original ILEC sometimes continues to provide certain services associated with a telephone call. One example is caller ID service where a customer with a suitable telephone may learn the identity of a caller prior to accepting a telephone call. Although caller ID may refer to identification of a caller telephone number, caller ID here refers to identification of a caller name.

The ILEC, and not the CLEC, may have access to data bases associating the caller telephone number with the caller's name. For the ILEC to be compensated for caller ID data base searches, calls associated with caller ID requests by ported ILEC telephone customers need to be identified and billed to the correct CLEC. As an individual ILEC may have UNE-P relationships with several CLECs and be associated with a large number of calls, proper billing is a formidable task.

In view of the above difficulties, there is a need for a method and system of associating caller ID queries with the parties responsible for their payment.

BRIEF SUMMARY OF THE INVENTION

The needs of the invention set forth above as well as further and other needs and advantages of the present invention are achieved by the embodiments of the invention described herein below.

According to one aspect of the invention, a method for selectively storing information associated with a telephone call includes capturing information associated with the telephone call, retaining the captured information when the telephone call is provided to a call recipient by a second carrier that is a UNE-P lessee of a first carrier, and storing the retained captured information when the retained captured information includes a CNAM (calling name) query.

In some embodiments of the invention, the method may further include placing the captured information within a CDR (call detail record) and a TDR (transaction detail record). In another embodiment, the CDR may include ISUP (ISDN User Part protocol) data, and, in a further embodiment, the method may further include correlating the CDR with external reference data. In an additional embodiment, the TDR may include TCAP (Transactions Capabilities Applications Part) data and the TCAP data may indicate that the telephone call involves the CNAM query. In certain embodiments, the method may further include correlating the ISUP data and the TCAP data on the basis of presence of the CNAM query.

In an additional embodiment, the method may further include associating the CNAM query with a customer belonging to the second carrier. In a further embodiment, a total call volume record may be incremented to include the CNAM query.

According to another aspect of the invention, a system for selectively storing information associated with a telephone call includes a processor capable of extracting and filtering information from communications regarding the telephone call and a data management component capable of correlating the extracted and filtered information with a carrier. In a certain embodiment of the invention, the communications may be between a first carrier STP and, at least one of, a first carrier SCP, a second carrier STP, and a first carrier SSP. In a further embodiment, the system may include a summary module containing the total volume of telephone calls ascribable to said carrier.

According to an additional aspect of the invention, a system for selectively storing information associated with a telephone call includes means for capturing information associated with the telephone call, means for retaining the captured information when the telephone call is provided to a call recipient by a second carrier, said second carrier being a UNE-P lessee of a first carrier, and means for storing the retained captured information, when the retained captured information includes a CNAM query.

In some embodiments of the invention, the system may include means for placing the captured information within a CDR and a TDR. In another embodiment, the CDR may include ISUP data, and, in a further embodiment, the system may include means for correlating the CDR with external reference data. In an additional embodiment, the TDR may include TCAP data and the TCAP data may indicate that the telephone call involves the CNAM query. In certain embodiments, the system may further include means for correlating the ISUP data and the TCAP data on the basis of presence of the CNAM query.

In an additional embodiment, the system may further include means for associating the CNAM query with the second carrier. In a certain other embodiment, the system may also include means for incrementing a total call volume record for the second carrier to include the CNAM query.

According to a certain aspect of the invention, a processor-readable computer program product encoded on one or more programmable storage devices and executable by one or more processors to perform method steps for selectively storing information associated with a telephone call includes instructions for capturing the information associated with the telephone call, for retaining the captured information when the telephone call is provided to a call recipient by a second carrier, which is a UNE-P lessee of a first carrier, and for storing the retained captured information, when the retained captured information includes a CNAM query.

For a better understanding of the present invention, together with other and further objects thereof, reference is made to the accompanying drawings and detailed description and its scope will be pointed out in the appended claims.

DETAILED DESCRIPTION OF THE INVENTION

Embodiments of the present invention provide for the proper billing of caller identifications to the carrier of which a call recipient is a telephone customer. Although the call recipient may have originally been a telephone customer of an ILEC, the call recipient may have subsequently elected to port his or her service, that is switch his or her service provider, from the ILEC to a CLEC. In such an arrangement, the ILEC handles the telephone call and provides the identity of the caller. In return, the CLEC may pay a flat rate to the ILEC for use of the UNE-P equipment belonging to the ILEC under a leasing arrangement and a per call charge for each caller identification query.

Figure 1:
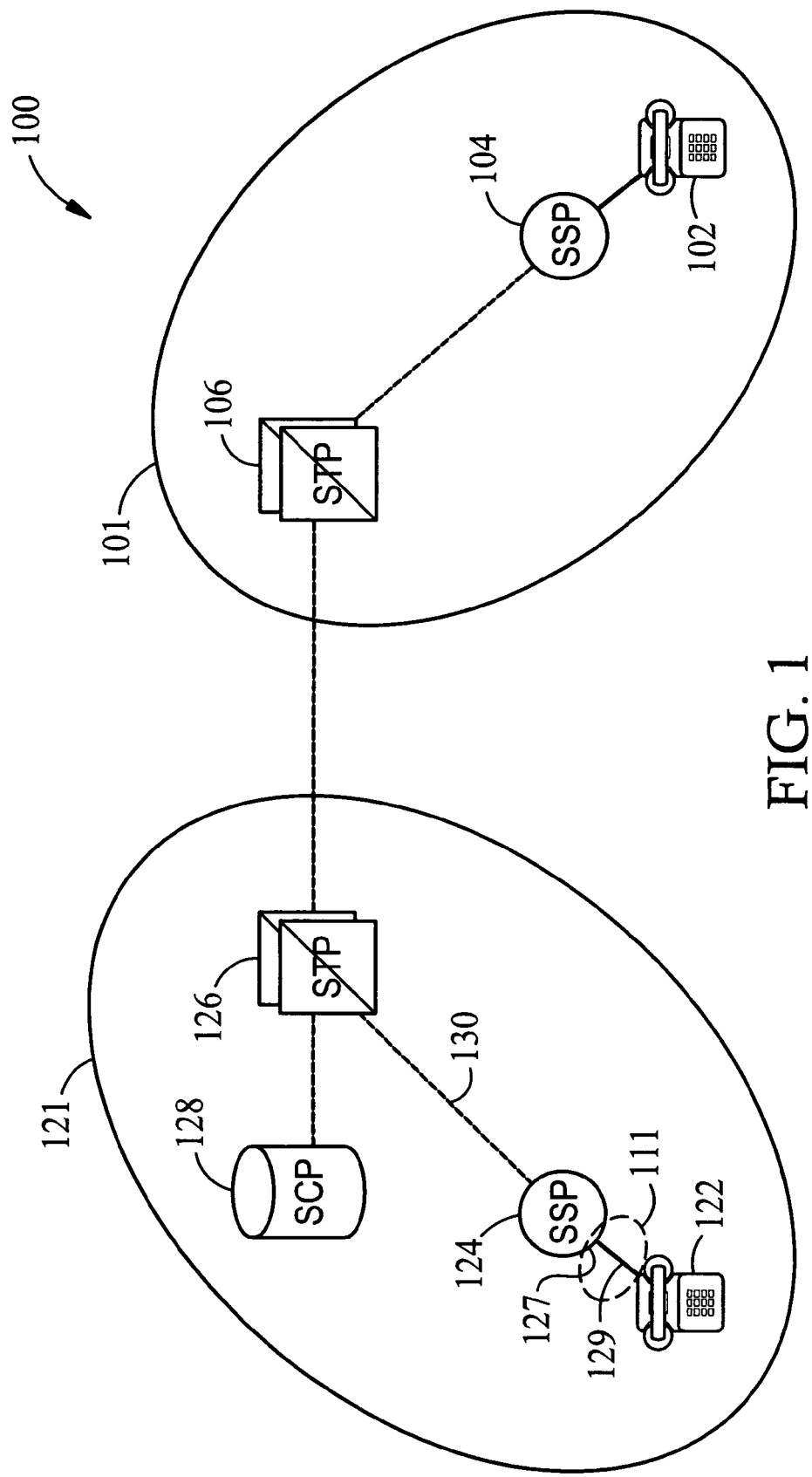
FIG. 1 is an illustration of prior art SS7 control pathways between a calling telephone and a called telephone where service to the called telephone has been transferred or ported from an ILEC to a CLEC that is a UNE-P lessee of the ILEC.

FIG. 1 illustrates schematically the prior art SS7 network 100 for processing of a telephone call from a caller to a call recipient. The caller telephone 102 is connected to a signal switching point (SSP) 104 of its local carrier 101. The caller carrier SSP 104 is connected to a caller carrier signal transfer point (STP) 106. During the establishment of the telephone call, control signals pass between the STP 106 of the carrier handling connections from the caller and STP 126 of the carrier handling connections to the call recipient. In this case, a CLEC has leased UNE-P connections 111, which form a portion of ILEC-owned system 121 and correspond to a portion 127 of the ILEC SSP 124, for example, a line card, and to an ILEC voice link 129, in order to communicate with the telephone 122 of the call recipient or called telephone or receiving telephone. The call recipient is a telephone customer of the CLEC, and the CLEC is an UNE-P lessee of the ILEC. Control signals reach the ILEC SSP 124 after first passing through the ILEC STP 126 over connections owned and controlled by the ILEC. In certain embodiments, the caller telephone 102 may be connected to the ILEC SSP 124 or to another SSP within the ILEC system 121.

A request for caller identification made by the call recipient may require consultation of a data base matching caller identity with caller telephone number. Often, the CLEC, using UNE-P facilities 111 leased from the ILEC, lacks such a data base and the ability to process caller identification requests on its own. However, the ILEC, of which the call recipient was originally a telephone customer, often has access to such data at an ILEC signal control point (SCP) 128. A query at the ILEC SCP 128 results in the caller identification being sent to the ILEC STP 126, and, subsequently to the call recipient telephone 122 via ILEC link 130, ILEC SSP 124 and ILEC voice link 129. If the call recipient is a telephone customer of the CLEC and has engaged the CLEC to provide caller identification service, the ILEC is to be compensated for matching the caller telephone number with the telephone caller name. This charge is in addition to the charge to the CLEC for lease of the UNE-P equipment forming part of the ILEC system 121.

Figure 2:
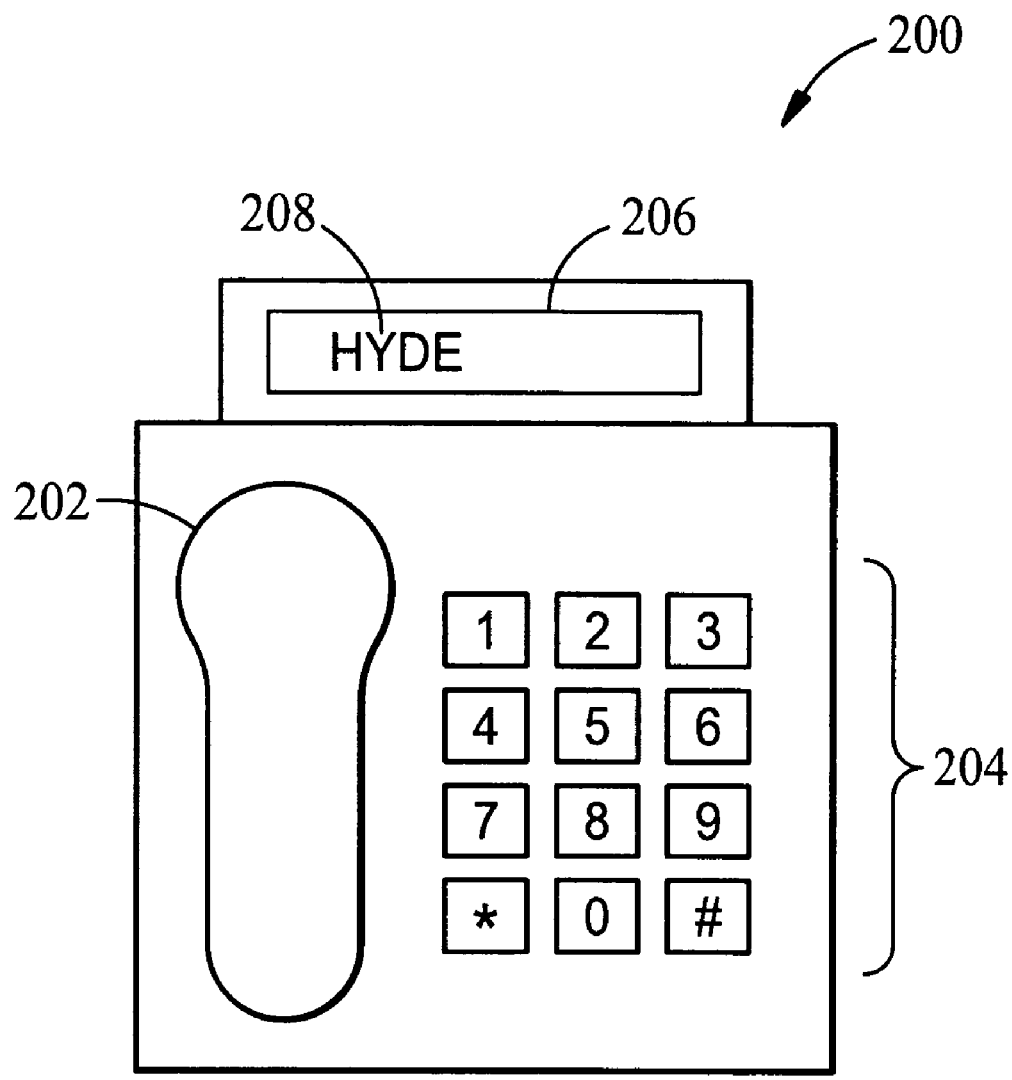
FIG. 2 is a schematic illustration of a prior art telephone receiver having a display on which a caller ID may be presented.

To receive caller identification, the call recipient requires a particular prior art telephone 200, as shown in FIG. 2. In addition to features such as a handset 202 and entry keys 204, the telephone 200 requires an alphanumeric display 206 for presentation of the caller name 208. In certain embodiments, the display 206 may also be provided by a separate display attached to the telephone 200.

Prior to, during, and after connection between the caller telephone 102 and the call recipient telephone 122, control signals pass between the caller carrier system 101 and the call recipient carrier system, ILEC system 121, providing details regarding the call origin, call destination, and other connection information, as shown in Table 1. For example, associated with the call origin is the calling number. These messages for managing telephone communications regarding connections may be sent as ISDN User Part protocols (ISUP).

Non-connection related information associated with the telephone call is exchanged between SSPs and STPs as Transaction Capabilities Applications Part (TCAP) messages, as shown in Table 3. Examples include messages associated with determining the routing number associated with a dialed 800 number and with checking the personal identification number of a calling card. Another task is associating a caller identity with a call source as provided by consultation with a system control point (SCP).

Figure 3:
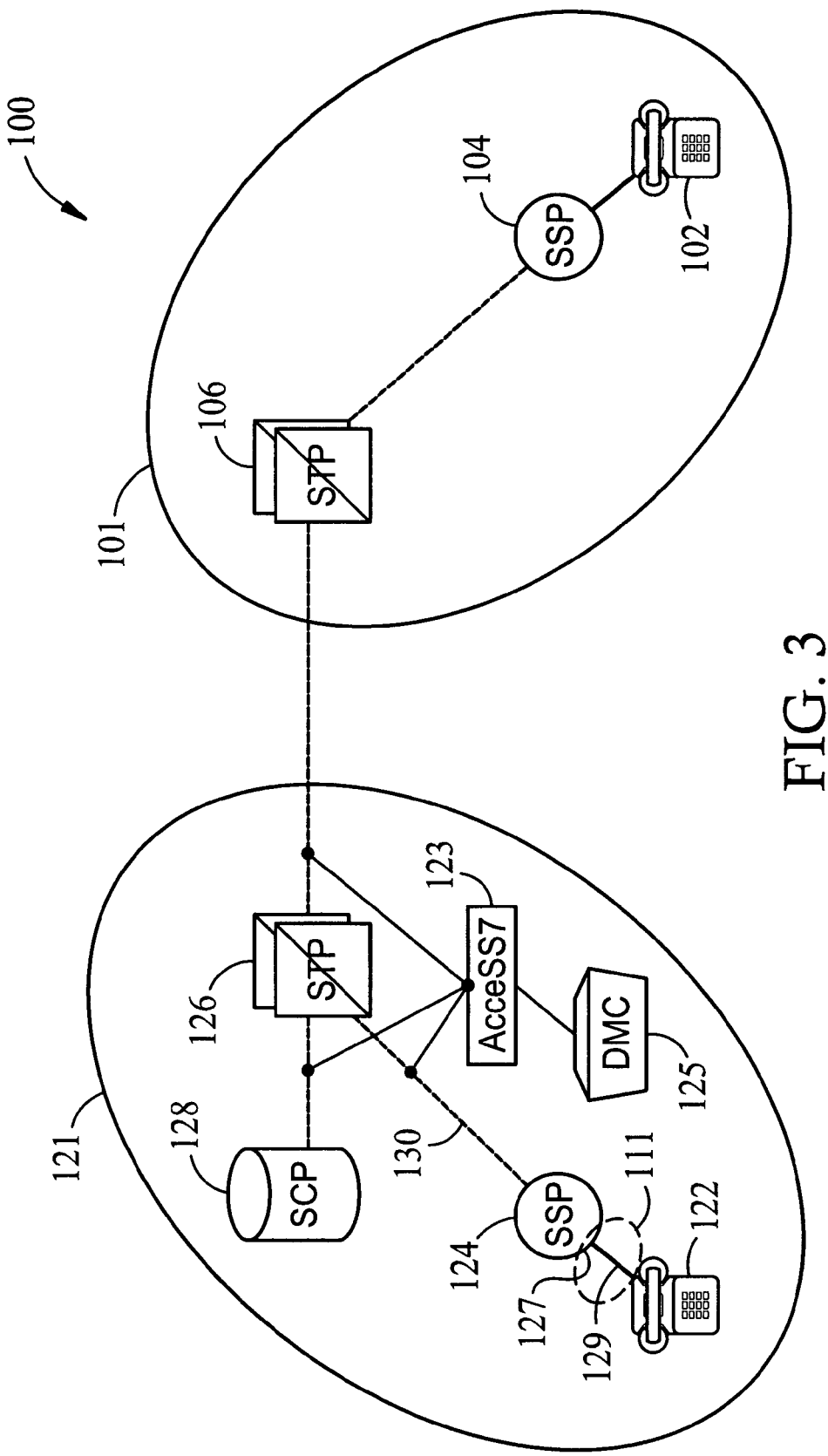
FIG. 3 is an illustration according to the present invention where an ILEC portion of the SS7 network includes a probe capture processor and a data management component.

FIG. 3 illustrates an embodiment of the present invention in the context of the SS7 network 100 where the ILEC system 121 has been augmented by a probe capture processor 123, such as Agilent AcceSS7 System, and a data management component (DMC) 125 allowing for capture, retention, correlation, and storage of information related to telephone calls completed or serviced by the ILEC system 121 on behalf of a UNE-P lessee CLEC. Signals to the ILEC STP 126, from the ILEC SCP 128, from the ILEC SSP 124, and from the interconnecting caller carrier STP 106, or from a subset of these, are monitored by the probe capture processor 123. The probe capture processor 123 extracts information from signals received by the ILEC STP 126 and stores the extracted information.

The specifics of the telephone call are maintained in several records associated with the telephone call. A call detail record (CDR) contains messages comprising parameters and timestamps associated with the telephone call, which provide detail regarding the call origin, destination, and other connection details. A transaction detail record (TDR) contains information related to the telephone call, as for example, a recording of provision of caller identification in fulfillment of a standing request of the call recipient.

Connection messages as contained in Table 1 may be stored in a call detail record (CDR), supplemented by time stamp information as contained in Table 2. Non-connection information as illustrated in Table 3, including TCAP messages, may be stored in a transaction detail record (TDR). The probe capture processor 123 provides the extracted information in a filtered form to the DMC, where the information is correlated, enriched, and placed in a separate database, for example, in an Oracle™ database.

In an aspect of the present invention that will be readily apparent to those of skill in the art, both probe capture processor 123 and DMC 125 comprise a processor-readable computer program product encoded on one or more programmable storage devices. The computer program product is executable by one or more processors including, for example, probe capture processor 123 and DMC 125 to perform method steps that permit determinations of appropriate volume totals of caller ID queries. Each such processor is preferably configured in a computer having one or more of the following drives: a hard disk drive for reading from and writing to a hard disk, a magnetic disk drive for reading from or writing to a removable magnetic disk, and an optical disk drive for reading from or writing to a removable optical disk such as a CD ROM. The drives and their associated computer-readable media provide nonvolatile storage of computer readable instructions, data structures, program modules, test results and other data for the processors.

Such processors are preferably part of a system including data communications medium (wired or wireless) between the probe capture processor 123 or the DMC 125 and a main memory, such as a random access memory (RAM) or other dynamic storage device for storing information and instructions to be executed by the probe capture processor 123 or the DMC 125. The main memory also may be used for storing temporary variables or other intermediate information during execution of instructions by the probe capture processor 123 or the DMC 125. A storage device, such as a magnetic disk or optical disk, may also be provided for storing and updating records such as, for example, CDRs, TDRs, CLEC list, correlated caller ID request information, and total caller ID request volume information summary report by carrier.

Figure 4:
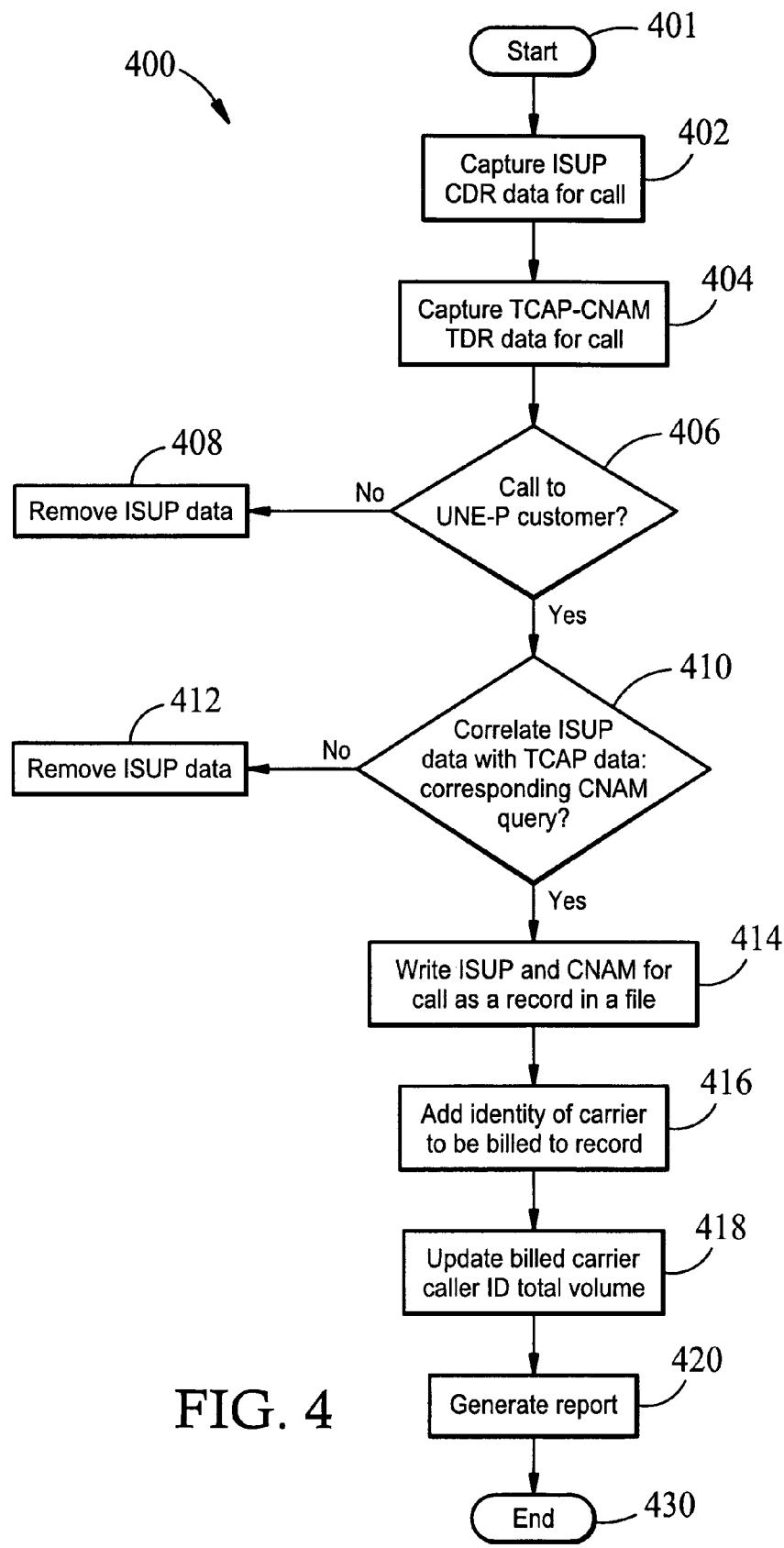
FIG. 4 is a flow chart according to an embodiment of the present invention illustrating a method for identifying telephone calls which are handled by a CLEC that is a UNE-P lessee of an ILEC and which are subject to reimbursement of the ILEC by the CLEC.

A method 400 according to an embodiment of the present invention to identify reimbursable telephone calls and to total the number of reimbursable telephone calls ascribable to various carriers is summarized in FIG. 4. During the telephone call to a call recipient telephone, ISUP data, including the telephone number of the call recipient telephone, is captured in the CDR for the telephone call (step 402) and TCAP data related to a caller identity request (CNAM) is captured in the TDR for the telephone call (step 404). Data is retained if the telephone number of the call recipient telephone receiving the telephone call matches external reference data identifying the call recipient telephone as one originally assigned to a first carrier and currently serviced by a second carrier, where the first carrier may be an ILEC and the second carrier may be a CLEC, that is, a UNE-P lessee of equipment owned by the first carrier (steps 406 and 408) and where the external reference data includes the telephone number of the call recipient telephone and the carrier to which the call recipient telephone is assigned. The ISUP data and the TCAP data for each telephone call handled for the second carrier by the first carrier are correlated (step 410) to identify those telephone calls further involving a request for caller identity, that is, associated with a CNAM request logged in the TCAP data. Data for other telephone calls is removed (step 412).

Figure 5:
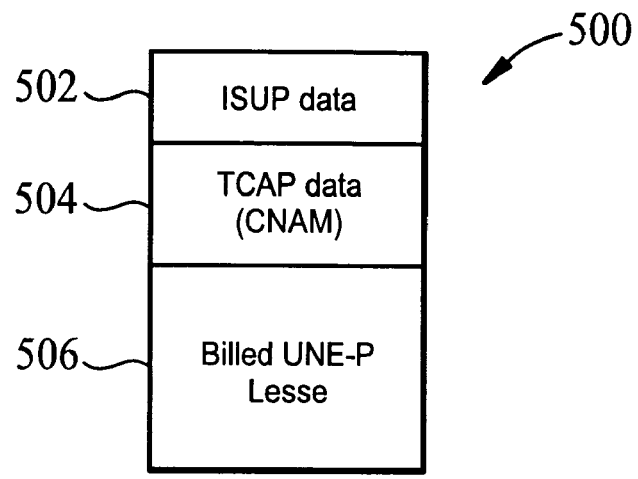
FIG. 5 illustrates an example of a record according to the present invention containing ISUP data for a telephone call, a caller identification request, and the CLEC, that is, the UNE-P lessee to be billed.
Figure 6:
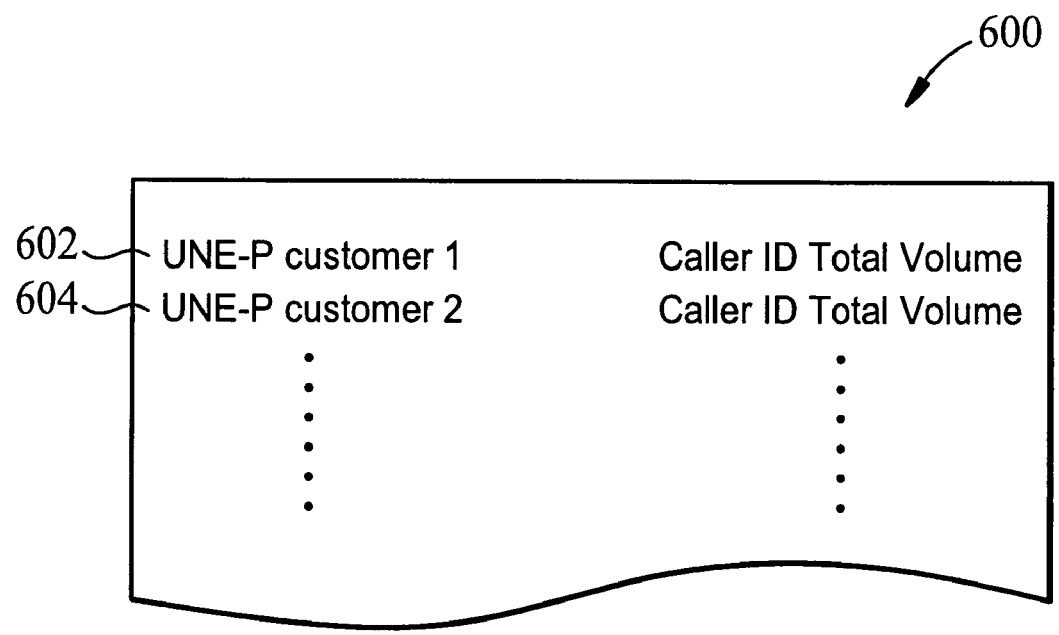
FIG. 6 illustrates an example of a summary report produced according to the present invention and containing a listing of total caller identification volume for each CLEC or UNE-P lessee of an ILEC.

For calls involving caller ID requests, the ISUP data containing the telephone number called 502 and the TCAP data containing the name registered to the telephone number called 504 are entered as a record 500 (step 414, FIG. 5) and the name of the second carrier to be billed added 506 (step 416). The total volume of caller ID requests to the first carrier, which may be the ILEC, on behalf of telephone customers of the second carrier, which may be the CLEC, which is the UNE-P lessee, is incremented to reflect the present request (step 418). A summary report 600 is presented (FIG. 6, step 420) containing the total volumes of caller ID requests serviced by the first carrier, which may be the ILEC, on behalf of second carriers 602 and 604, which may be CLECs assigned telephone numbers originally serviced by the first carrier or the ILEC. The summary report may have the format of a Crystal™ report to the first carrier.

Although the invention has been described with respect to various embodiments, it should be realized that this invention is also capable of a wide variety of further and other embodiments within the spirit and the scope of the appended claims.

TABLE 1

| Message | Parameter | Description |
|---|---|---|
| initial address message (IAM) | | INITIAL ADDRESS MESSAGE |
| | Originating Point Code (OPC) | The SS7 node (e.g. switching office or STP) that is sending the message |
| | Destination Point Code (OPC) | The SS7 node (e.g. switching office or STP) that the message is being sent to |
| | Calling Number | The calling number of the user making the telephone call |
| | Charge Number | The charge number of the user making the call |
| | Called Number | The number dialed by the user |
| | Carrier Identification Code | The IXC selected by the user (e.g. via 1010XXX) |
| | Forward Interworking Parameter | An indicator as to whether SS7 or non-SS7 interworking was encountered prior to this point in the telephone call |
| address complete message (ACM) | | ADDRESS COMPLETE MESSAGE |
| | OPC/DPC | As above |
| | Backward Interworking Parameter | An indicator as to whether SS7 or non-SS7 interworking was encountered ahead of this point in the telephone call |
| Answer message (ANM) | | ANSWER MESSAGE |
| | OPC/DPC | As above |
| release message (REL) | | RELEASE MESSAGE |

TABLE 1-continued

| Message | Parameter | Description |
|---|---|---|
| | OPC/DPC | As above |
| | Release | An indication of the status |
| | Cause Code | of the telephone call (e.g. answered, busy) |
| release complete message (RLC) | | RELEASE COMPLETE MESSAGE |
| | OPC/DPC | As above |
| T100 | | |

TABLE 2

| | |
|---|---|
| initial address message (IAM) timestamp | The time the trunk was seized |
| Address complete message (ACM) timestamp | The time the called telephone began ringing |
| Answer message (ANM) timestamp | The time the called telephone was answered |
| release message (REL) timestamp | The time the first of either the called or calling telephone was hung up |
| release complete message (RLC) timestamp | The time the second of the called or calling telephone was hung up |

TABLE 3

| Message | Parameter | Description |
|---|---|---|
| Begin | Query | Type of Query performed |
| End | Response | Value returned |

What is claimed is:

1. A method for selectively storing information associated with a telephone call, the method including:
   capturing the information associated with the telephone call;
   retaining the captured information when the telephone call is provided to a call recipient by a second carrier, the second carrier being a UNE-P (unbundled network element platform) lessee of a first carrier; and
   storing the retained captured information, when the retained captured information includes a CNAM (calling name) query.

2. The method of claim 1, further comprising: placing the captured information within a CDR (call detail record) and a TDR (transaction detail record).

3. The method of claim 2, wherein the CDR contains ISUP (ISDN user part protocol) data.

4. The method of claim 3, further comprising: correlating the CDR with external reference data.

5. The method of claim 4, wherein the TDR contains TCAP (transactions capabilities applications part) data.

6. The method of claim 5, wherein the TCAP data indicates that the telephone call involves the CNAM query.

7. The method of claim 6, further comprising: correlating the ISUP data and the TCAP data on the basis of presence of the CNAM query.

8. The method of claim 1, further comprising: associating the CNAM query with the second carrier.

9. The method of claim 8, further comprising: incrementing a total call volume record for the second carrier to include the CNAM query.

10. A system for selectively storing information associated with a telephone call, the system comprising:
    means for capturing the information associated with the telephone call;
    means for retaining the captured information when the telephone call is provided to a call recipient by a second carrier, said second carrier being a UNE-P lessee of a first carrier; and
    means for storing the retained captured information, when the retained captured information includes a CNAM query.

11. The system of claim 10, further comprising: means for placing the captured information within a CDR and a TDR.

12. The system of claim 11, wherein said CDR contains ISUP data.

13. The system of claim 12, further comprising: means for correlating the CDR with external reference data.

14. The system of claim 13, wherein said TDR contains TCAP data.

15. The system of claim 14, wherein said TCAP data indicates that the telephone call involves said CNAM query.

16. The system of claim 15, further comprising: means for correlating said ISUP data and said TCAP data on the basis of presence of said CNAM query.

17. The system of claim 10, further comprising: means for associating said CNAM query with said second carrier.

18. The system of claim 17, further comprising: means for incrementing a total call volume record for the second carrier to include the CNAM query.

19. A processor-readable computer program product encoded on one or more programmable storage devices, the computer program product executable by one or more processors to perform method steps for selectively storing information associated with a telephone call, comprising instructions for:
    capturing the information associated with the telephone call;
    retaining the captured information when the telephone call is provided to a call recipient by a second carrier, said second carrier being a UNE-P lessee of a first carrier; and
    storing the retained captured information, when the retained captured information includes a CNAM query.

* * * * *